United States Patent
Itoi et al.

(10) Patent No.: US 8,083,267 B2
(45) Date of Patent: Dec. 27, 2011

(54) FLUID COUPLING AND METHOD OF DESIGNING THE SAME

(75) Inventors: Shigeru Itoi, Osaka (JP); Michio Yamaji, Osaka (JP); Tsutomu Shinohara, Osaka (JP); Kenji Tsubota, Osaka (JP); Tadanobu Yoshida, Osaka (JP); Susumu Ozawa, Osaka (JP)

(73) Assignee: Fujikin Incorporated, Osaka-Shi (JP)

( * ) Notice: Subject to any disclaimer, the term of this patent is extended or adjusted under 35 U.S.C. 154(b) by 244 days.

(21) Appl. No.: 10/536,036

(22) PCT Filed: Oct. 31, 2003

(86) PCT No.: PCT/JP03/13975
§ 371 (c)(1), (2), (4) Date: May 23, 2005

(87) PCT Pub. No.: WO2004/048836
PCT Pub. Date: Jun. 10, 2004

(65) Prior Publication Data
US 2006/0055122 A1   Mar. 16, 2006

(30) Foreign Application Priority Data
Nov. 28, 2002 (JP) .................................. 2002-344877

(51) Int. Cl.
*F16L 17/00* (2006.01)
(52) U.S. Cl. ......................... 285/368; 285/917; 285/910
(58) Field of Classification Search .................. 277/626, 277/627, 644, 649, 612, 322, 614; 285/910, 285/368, 917
See application file for complete search history.

(56) References Cited

U.S. PATENT DOCUMENTS

| | | | | |
|---|---|---|---|---|
| 323,731 | A * | 8/1885 | Phillips | 277/649 |
| 2,050,137 | A * | 8/1936 | Walsh | 285/331 |
| 3,090,630 | A * | 5/1963 | Gasche | 277/641 |
| 4,294,477 | A * | 10/1981 | Ahlstone | 285/336 |
| 4,407,516 | A * | 10/1983 | Le et al. | 277/648 |
| 5,052,724 | A * | 10/1991 | Konrad et al. | 285/190 |
| 6,357,759 | B1 * | 3/2002 | Azuma et al. | 277/602 |
| 6,357,760 | B1 * | 3/2002 | Doyle | 277/604 |
| 6,409,180 | B1 * | 6/2002 | Spence et al. | 277/608 |

(Continued)

FOREIGN PATENT DOCUMENTS

DE   731 042   2/1943

(Continued)

OTHER PUBLICATIONS

Gieck, Kurt, and R. Gieck, Engineering Formulas, 1997, McGraw-Hill, 7th Edition, p. P2.*

(Continued)

*Primary Examiner* — Aaron Dunwoody
(74) *Attorney, Agent, or Firm* — Kratz, Quintos & Hanson, LLP (57) ABSTRACT

Each of ridges 7 on respective opposite side surfaces of a gasket 4 has a trapezoidal cross sectional shape defined by an outer tapered face 7a providing an outer peripheral surface, an inner tapered face 7b providing an inner peripheral surface and a flat face 7c providing a top end surface. The hardness of the gasket 4, the angle between the tapered faces 7a, 7b of the ridge 7, the height of the ridge 7 and the area of the flat top end face 7c of the ridge are so determined that the value of thrust for tightening up the coupling is between a predetermined minimum value and a predetermined maximum value.

2 Claims, 11 Drawing Sheets

U.S. PATENT DOCUMENTS

| | | | |
|---|---|---|---|
| 6,905,125 B2 * | 6/2005 | Shibata et al. | 277/626 |
| 2003/0164594 A1 * | 9/2003 | Whitlow et al. | 277/609 |

FOREIGN PATENT DOCUMENTS

| | | | |
|---|---|---|---|
| DE | 3509136 A1 * | 9/1986 |
| FR | 1.583.060 | 10/1969 |
| JP | 55115659 A * | 9/1980 |
| JP | 58-72560 | 5/1983 |
| JP | 166578/1981 | 5/1983 |
| JP | 60-147886 | 10/1985 |
| JP | 34487/1984 | 10/1985 |
| JP | 03209067 A * | 9/1991 |
| JP | 9-32984 | 2/1997 |
| JP | 09-032984 | 2/1997 |
| JP | 11-173476 | 6/1999 |
| JP | 2003194225 A * | 7/2003 |
| WO | WO 93/18331 | 9/1993 |

OTHER PUBLICATIONS

Shigley, Joseph E., and Charles R. Mischke, Mechanical Engineering Design, McGraw-Hill, 5th Edition, pp. 14, 345-351, 196, and 197.*
International Search Report dated Mar. 2, 2004 received in corresponding PCT Application No. PCT/JP03/13975 from the Japanese Patent Office (2 pages).
Supplementary European Search Report dated Oct. 29, 2007.

* cited by examiner

FLUID COUPLING AND METHOD OF DESIGNING THE SAME

TECHNICAL FIELD

The present invention relates to fluid couplings, and more particularly to fluid couplings wherein a gasket interposed between coupling members is deformed to provide sealing properties, and a method of designing the coupling.

BACKGROUND ART

The publication of JP-A No. 09-032984 (the drawings, especially FIGS. 14 to 17) filed by the present applicant already discloses a fluid coupling comprising a first and a second coupling member having respective fluid channels communicating with each other, a gasket in the form of an apertured disk and interposed between abutting end faces of the two coupling members and screw means for fastening the two coupling members together. Each of the first and second coupling members is provided in the abutting end face thereof with an annular projection for holding the gasket. The publication also discloses a first and a second coupling member each provided with an annular recessed portion formed in an abutting end face thereof and having a flat bottom face. The recessed portions of the two coupling members define a space having an annular gasket disposed therein. The gasket has an annular ridge formed on each of opposite side surfaces thereof.

With the fluid coupling described above, the end face of each coupling member including the gasket holding annular projection requires high-precision working including provision of a mirror finish, necessitates time and labor for working and therefore has the problem that the working offers an obstacle to an improvement in the efficiency of the entire process for manufacturing the coupling. Accordingly, it appears preferable to use couplings of the type wherein the gasket has annular ridges on the respective opposite side surfaces, whereas a detailed study still remains to be made about the shape of gaskets, and no microscopic studies have heretofore been made especially about the shape of the projections or ridges to be provided on the gasket although ridges of various shapes may be usable.

An object of the present invention is to construct a proper seal structure between the coupling members with attention directed also to the shape of the gasket and to provide a fluid coupling which is improved in both sealing properties and durability and a method of designing the coupling.

DISCLOSURE OF THE INVENTION

The present invention provides a fluid coupling comprising a first and a second coupling member having respective fluid channels communicating with each other, a gasket interposed between abutting end faces of the two coupling members and screw means for fastening the two coupling members together, each of the first and second coupling members being provided in the end face thereof with an annular recessed portion having a flat bottom face, the gasket being annular and disposed within a space defined by the recessed portions of the two coupling members, the gasket having an annular ridge formed on each of opposite side surfaces thereof, the fluid coupling being characterized in that the ridge of the gasket has a trapezoidal cross sectional shape defined by an outer tapered face providing an outer peripheral surface, an inner tapered face providing an inner peripheral surface and a flat face providing a top end surface.

The fluid coupling of the present invention is usable of course for connecting two pipes together and also for fluid-tightly connecting block members, each having a fluid channel, to each other.

With the fluid coupling of the present invention, the gasket has a trapezoidal cross sectional shape, so that the variable factors are three, i.e., the angle between the tapered faces, the height of the ridge and the area of flat top end faces of the ridge. Accordingly the coupling has a greater degree of freedom of design and higher sealing properties and durability than those having a ridge of triangular cross section wherein only two factors, i.e., the angle between the tapered faces and the height of the ridge, are variable, or those having a projection of rectangular cross section wherein only two factors, i.e., the width and height of the projection, are variable.

Preferably, the hardness of the gasket, the angle between the tapered faces of the ridge, the height of the ridge and the area of the flat top end face of the ridge are so determined that the value of thrust for tightening up the coupling will be between a predetermined minimum value and a predetermined maximum value. This ensures both the sealing properties and durability at the same time.

Preferably, the angle $\alpha$ between the outer tapered face and the inner tapered face of each annular ridge of the gasket is 50 to 130 deg.

For example, with an angle $\alpha$ of 90 deg serving as a reference, thrust values involved in the cases of angles $\alpha$ 60 deg and 120 deg can then be determined to readily obtain gaskets having ridges of proper shapes.

The present invention provides a method of designing a fluid coupling comprising a first and a second coupling member having respective fluid channels communicating with each other, a gasket interposed between abutting end faces of the two coupling members and screw means for fastening the two coupling members together, each of the first and second coupling members being provided in the end face thereof with an annular recessed portion having a flat bottom face, the gasket being annular and disposed within a space defined by the recessed portions of the two coupling members, the gasket having an annular ridge formed on each of opposite side surfaces thereof, the fluid coupling designing method being characterized in that the ridge of the gasket has a trapezoidal cross sectional shape defined by an outer tapered face providing an outer peripheral surface, an inner tapered face providing an inner peripheral surface and a flat face providing a top end surface, the hardness of the gasket, the angle between the tapered faces of the ridge, the height of the ridge and the area of the flat top end face of the ridge being so determined that the value of thrust for tightening up the coupling is between a predetermined minimum value and a predetermined maximum value.

Preferably, the hardness of the gasket, the taper angle of the ridge of the gasket, the height of the ridge and the area of the flat top end face of the ridge are so determined as to satisfy the following expression:

surface pressure as determined from minimum tightening-up force×safety factor<experimental value of thrust per unit area for tightening up the coupling<thrust per unit area as determined from the Vickers hardness of the gasket×safety factor.

The minimum tightening-up force to be used is, for example, the greater of the two, i.e., the bolt load when the coupling is in use, and the bolt load when the gasket is tightened up. The experimental value of thrust per unit area for tightening up the coupling is determined from an actual thrust measurement and a calculated value of the pressure receiving surface. The thrust per unit area as determined from the Vickers hardness of the gasket can be determine from an equation representing the Vickers hardness $HV=0.102 \times F/S$ (wherein F is a test load, and S is the surface area).

Both the sealing properties and durability can be reliably ensured by determining the hardness and shape of the gasket so as to satisfy the above expression.

BEST MODE OF CARRYING OUT THE INVENTION

Embodiments of the invention will be described below with reference to the drawings. In the following description, left- and right-hand sides of FIG. 1 will be referred to as "left" and "right."

Figure 1:
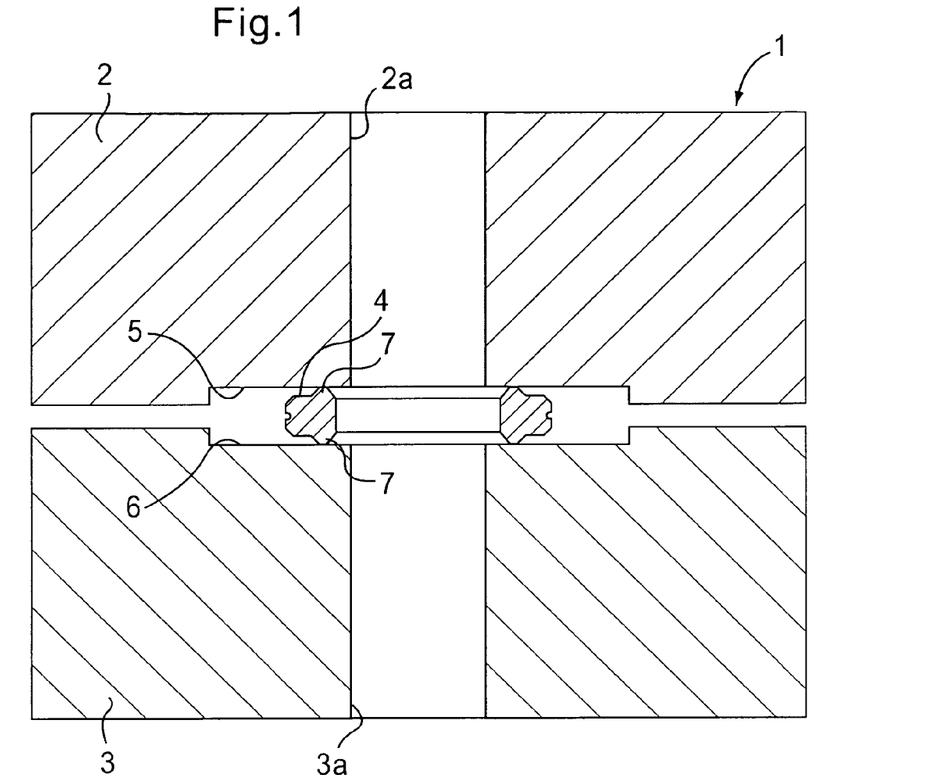
FIG. 1 is a sectional view showing a first embodiment of fluid coupling according to the invention.
Figure 11:
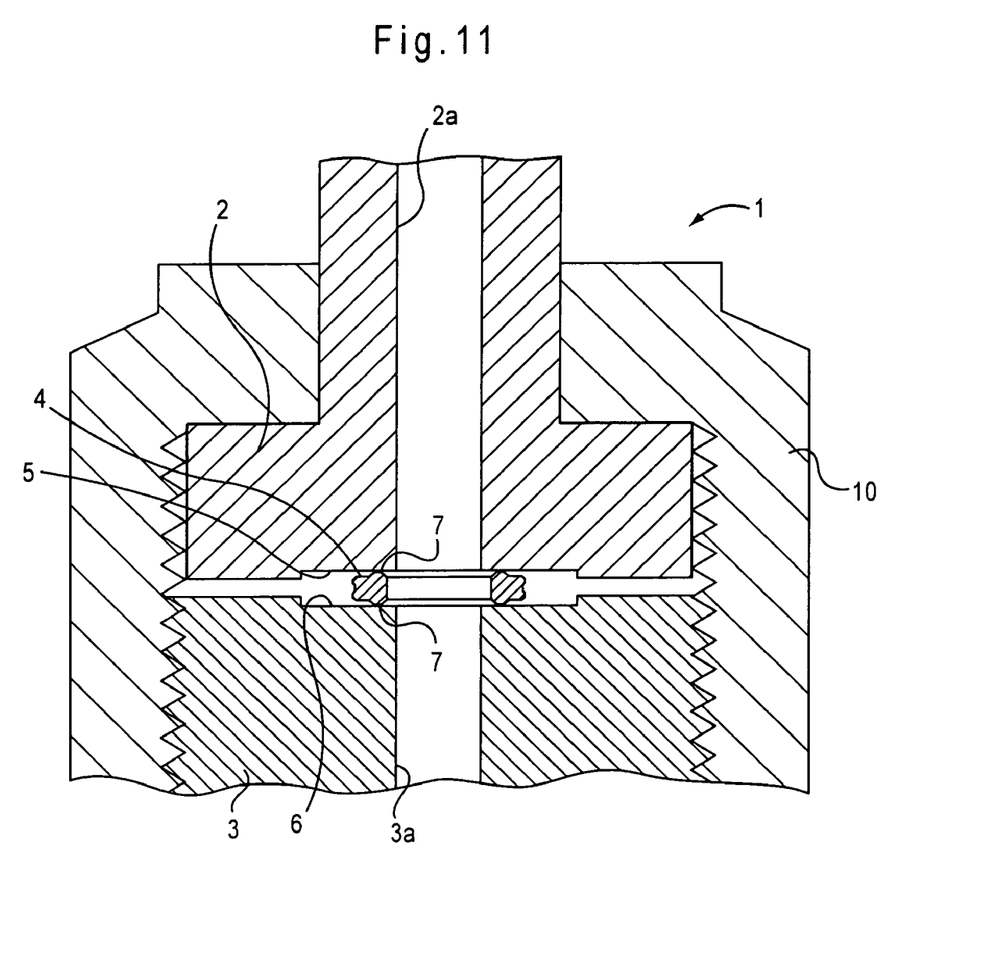
FIG. 11 is a sectional view showing an embodiment of the invention including a screw means.
Figure 11A:
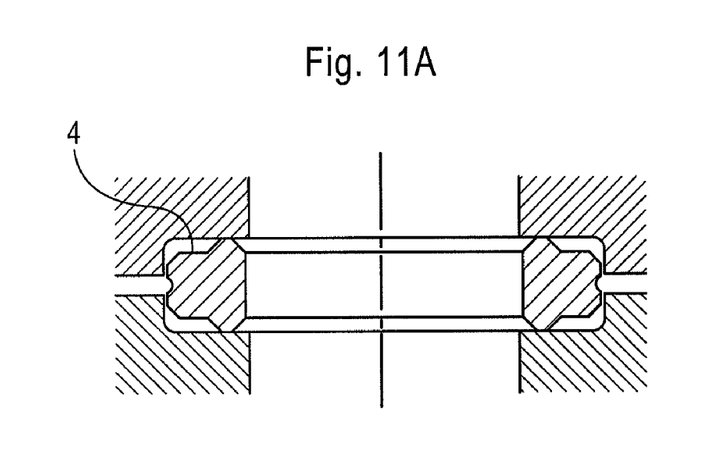
FIG. 11A shows a gasket while the gasket is not in a deformed state.
Figure 11B:
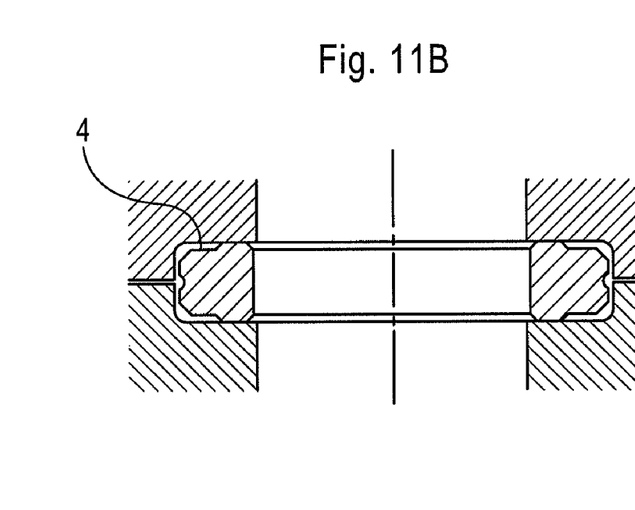
FIG. 11B shows a gasket while the gasket is in a deformed state.

FIG. 1 shows a first embodiment of fluid coupling of the invention. The fluid coupling 1 comprises first and second coupling members 2, 3 having respective fluid channels 2a, 3a communicating with each other, an annular gasket 4 interposed between abutting end faces of the two coupling members 2, 3 and screw means 10 (see FIG. 11) for fastening the two coupling members 2, 3 together.

The first and second coupling members 2, 3 are provided in the abutting end faces thereof with respective annular recessed portions 5, 6 each having a flat bottom face. The gasket 4 is disposed in a gasket enclosing space defined by the recessed portions 5, 6 of the two coupling members 2, 3. The gasket 4 is provided with an annular ridge 7 on each of opposite side surfaces thereof.

Figure 2:
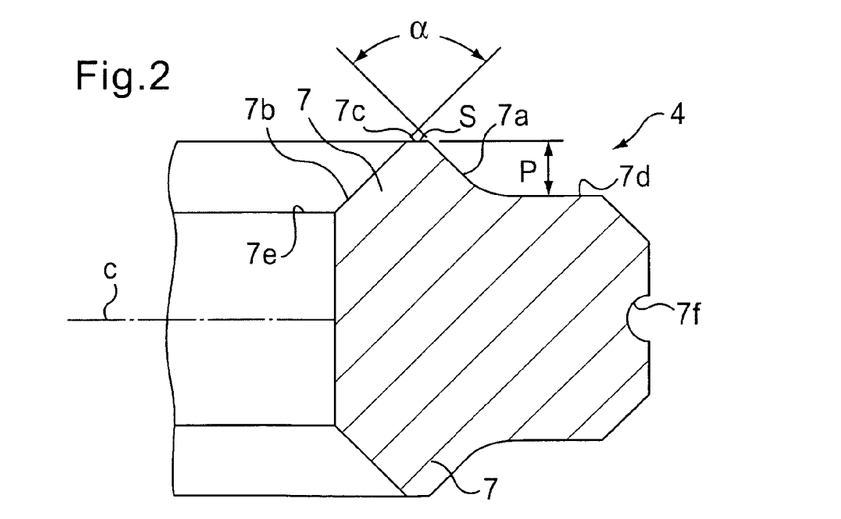
FIG. 2 is an enlarged view in section of a gasket for use in the fluid coupling of the invention.

As shown on an enlarged scale in FIG. 2, the ridge 7 of the gasket 4 has a trapezoidal cross sectional shape defined by an outer tapered face 7a providing an outer peripheral surface, an inner tapered face 7b providing an inner peripheral surface and a flat face 7c providing a top end face. A face 7d extending radially outward from the base end of the outer tapered face 7a serves as a reference face for determining the height of the ridge 7. The distance from a plane c through the center of the gasket 4 with respect to the axial direction thereof to the base end 7e of the inner tapered face 7b is slightly smaller than the distance from the center plane c through the gasket 4 to the reference face 7d (i.e., one half of the thickness of the gasket other than the ridge). The gasket 4 has an inside diameter (diameter of fluid channel) greater than the diameter of the fluid channels 2a, 3a of the two coupling members 2, 3. The axially opposite edges of the outer periphery of the gasket 4 are chamfered, and a cavity 7f having a circular-arc cross section is formed in the axial midportion of outer periphery of the gasket 4.

The Vickers hardness HV of the gasket 4, the taper angle $\alpha$ between the tapered faces 7a, 7b of the ridge 7, the height P of the ridge 7 and the area S of the flat face 7c of the ridge 7 at the top end thereof are so determined that the value of thrust will be between a predetermined minimum value and a predetermined maximum value when the displacement due to tightening is altered according to the designing method to be described below. The two coupling members 2, 3 are about 300 in Vickers hardness HV.

A description will be given of the method of designing the fluid coupling according to the invention.

The following experiments were conducted on the features of the fluid coupling 1 described with the findings given below.

Figure 3:
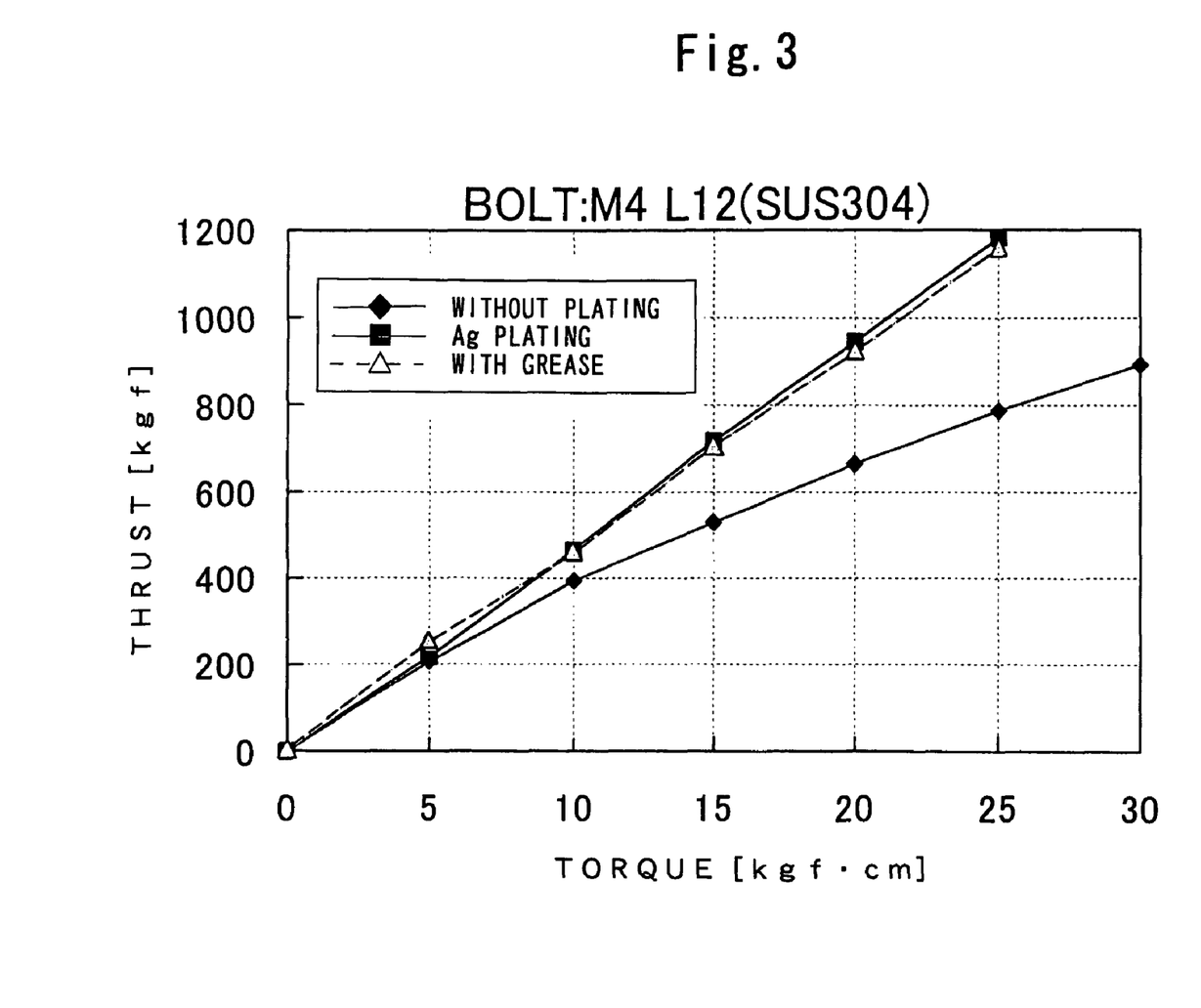
FIG. 3 is a graph showing the relationship between the torque and the thrust as established for the fluid coupling of the invention.

FIG. 3 is a graph showing the relationship between the toque and the thrust. The graph shows the relationship between the torque and the thrust, as determined by tightening up coupling members in the form of blocks with four M4 bolts. Three kinds of bolts were used for the experiment: bolts without plating, bolts plated with silver, and bolts without plating and with application of grease. Use of these bolts indicates that the silver plating or grease reduces the friction involved in rotation, permitting the thrust to increase in proportion to the torque, and that in the case of the bolts without plating, the thrust increases at a smaller rate relative to the increase in the torque.

Figure 4:
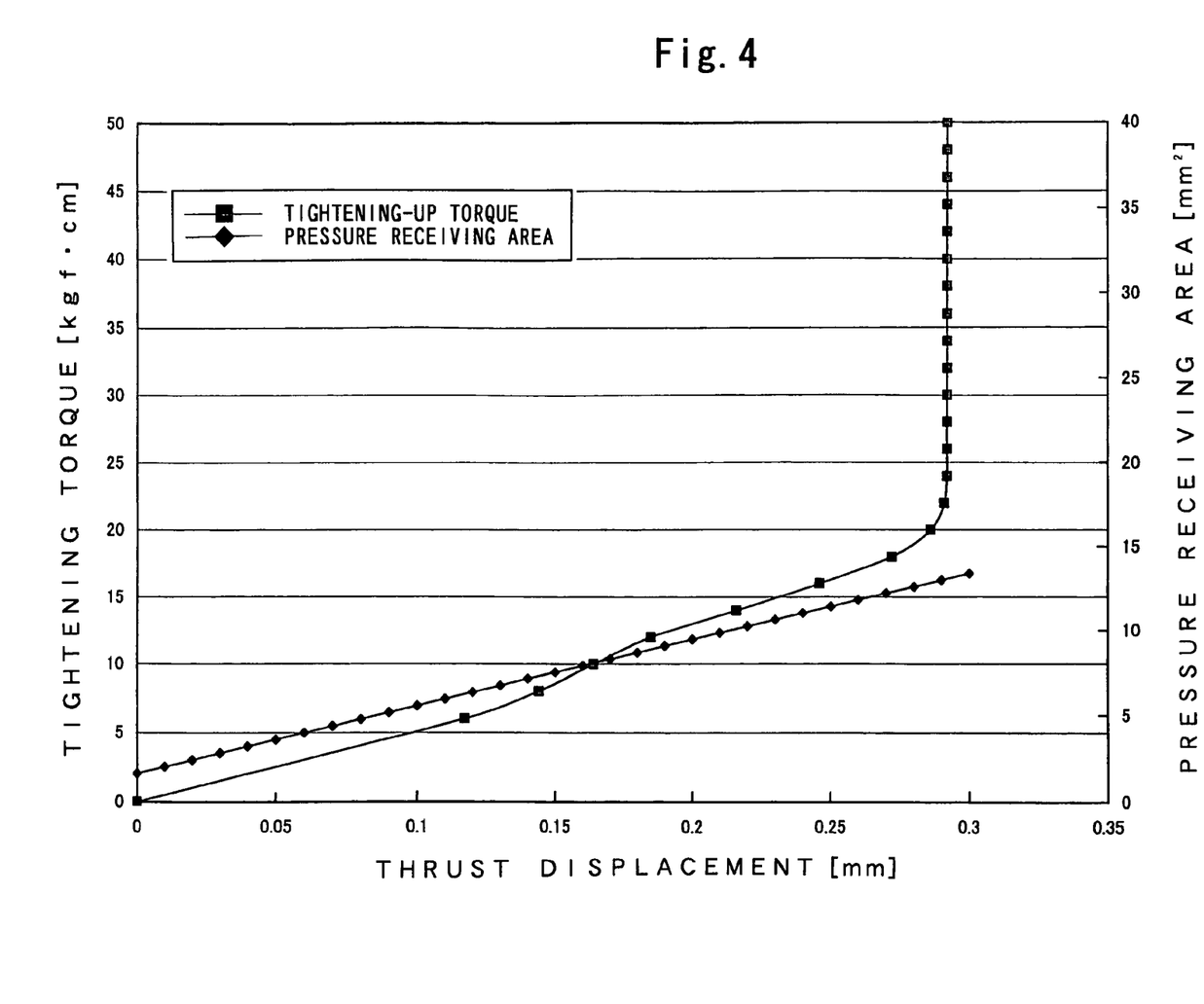
FIG. 4 is a graph showing the relationship of the tightening-up torque and the pressure receiving area to the displacement as established for the fluid coupling of the invention.

The graph of FIG. 4 shows the relationship of the tightening-up torque and the pressure receiving area to the displacement when the gasket 4 is so shaped that $\alpha=90$ deg and $P=0.29$ mm. It is seen that the pressure receiving area increases in proportion to the displacement, and that the displacement remains almost unaltered despite an increase in the tightening-up torque after the displacement reaches the height P of the ridge.

To obtain the required sealing properties, a minimum tightening-up force is needed, that is, thrust of not smaller than a predetermined value is necessary for tightening up. Further to ensure the required strength, it is required that the thrust be not in excess of a predetermined value corresponding to the hardness of the gasket 4. Accordingly, when the factor of safety is also considered, it is preferred that the gasket 4 have such a hardness and shape (taper angle $\alpha$, height P of the ridge and area S of flat top end face) as to satisfy the following expression:

Minimum tightening-up force×safety factor<thrust for tightening-up the coupling<thrust corresponding to the surface hardness×safety factor.

When the variation in area due to tightening is considered, it is more preferable to use the following expression:

surface pressure as determined from minimum tightening-up force×safety factor<experimental value of thrust per unit area for tightening up the coupling<thrust per unit area as determined from the Vickers hardness of the gasket×safety factor.

The minimum tightening-up force to be used is the greater of the two, i.e., the bolt load when the coupling is in use and the bolt load when the gasket is tightened up. Table 1 shows the mathematic expressions for calculating the minimum tightening-up force, etc. and the meanings of symbols.

TABLE 1

| Symbol | Meaning of symbol | Relational expression |
| --- | --- | --- |
| HV | Vickers hardness | HV = 0.102*F/S |
| P | Test load [N] | |
| S | Surface area [mm$^2$] | |
| Wm1 | Minimum bolt load required for use [N] | Wm1 = n*G*P* (G + 8*b*m)/4 |
| Wm2 | Minimum bolt load required for tightening up gasket [N] | Wm2 = n*b*G*y |
| G | Diameter of circle through position where gasket reaction acts [mm] | |
| P | Design pressure [MPa] | |
| m | Gasket factor (to be selected in view of gasket material and contact face) | |
| b | Effective width of gasket seat [mm] | |
| y | Minimum design tightening-up pressure of gasket or coupling contact face [N/mm$^2$] | |
| Am1 | Required total cross sectional area of bolt in use [mm$^2$] | Am1 = Wm2/$\sigma_b$ |
| Am2 | Required total cross sectional area of bolt when gasket is tightened up [mm$^2$] | Am2 = Wm2/$\sigma_a$ |
| Am | Required total cross sectional area of bolt [mm$^2$] | Am = Am1 or Am2 (the greater) |
| Wm1 | Bolt load | |
| Wm2 | Bolt load | |
| $\sigma_a$ | Permissible tensile stress of bolt at room temperature [kgf/mm$^2$] | |
| $\sigma_b$ | Permissible tensile stress of bolt at design temperature [kgf/mm$^2$] | |
| Wo | Load on bolt in use [kgf] | Wo = Wm1 |
| Wg | Bolt load when gasket is tightened up (kgf) | Wg = (Am + Ab) *$\sigma_a$/2 |
| Ab | Effective cross sectional area of gasket [mm$^2$] | Ab = 8.78(M4 bolt effective cross s. area) |
| bo | Basic width of gasket seat [mm] | |

Figure 5:
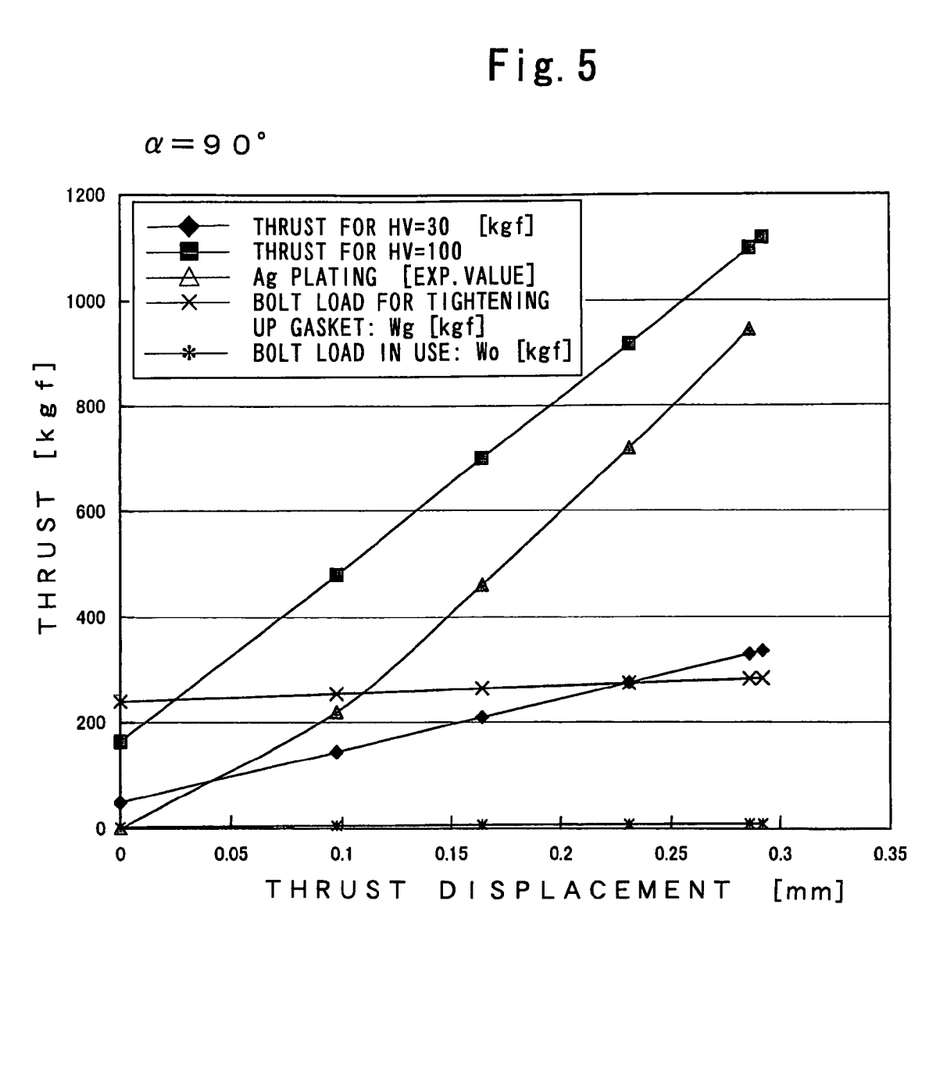
FIG. 5 is a graph for use in obtaining gaskets suitable for use in the fluid coupling of the invention, in the case where the taper angle of a ridge is 90 deg.

FIG. 5 shows a graph for use in obtaining gaskets suitable for use in the fluid coupling of the invention. The displacement is plotted as abscissa, the thrust or bolt load as ordinate, and the taper angle α of the ridges on the gasket is 90 deg to determine the relationship between the displacement and the thrust or bolt load. With reference to the graph of FIG. 5, a comparison between the gasket which is 30 in Vickers hardness HV and the gasket with a Vickers hardness HV of 100 shows that the thrust is about 340 kgf and about 1120 kgf, respectively, at a maximum displacement (upon completion of tightening up), and that care must be taken of the damage to or break in the coupling or bolt due to excessive thrust, in the case of the gasket having a hardness of HV 100. The graph further indicates that the use of bolts of silver plating (indicated by Ag PLATING) results in experimental values intermediate between those of the above two specimens, and that the bolt load in the state of use is much less than the bolt load for tightening up the gasket.

Figure 6:
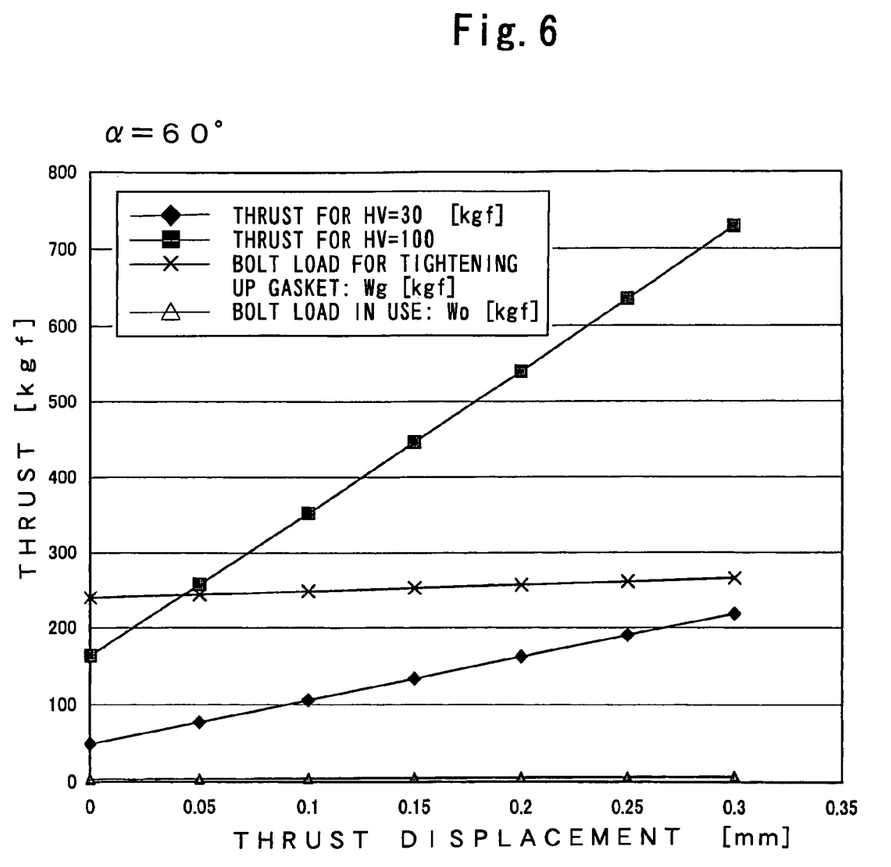
FIG. 6 is a graph similar to FIG. 5 in the case where the taper angle of the ridge is 60 deg.
Figure 7:
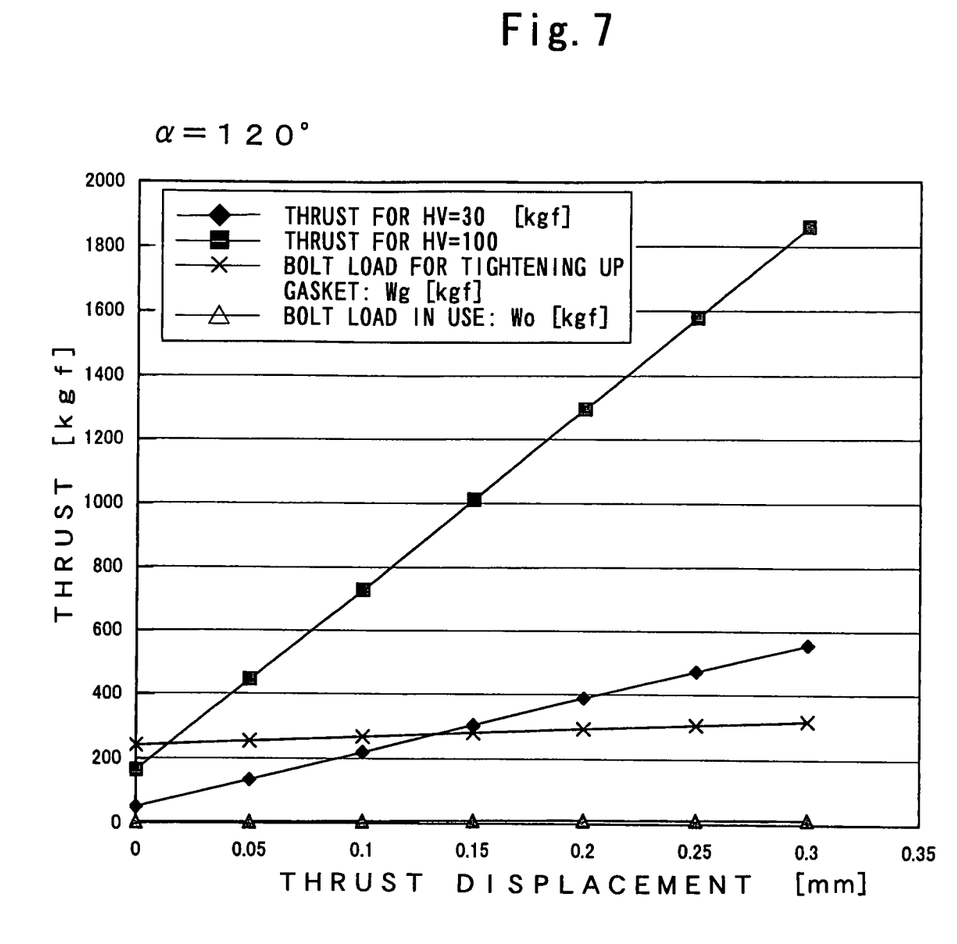
FIG. 7 is a graph similar to FIG. 5 in the case where the taper angle of the ridge is 120 deg.

FIGS. 6 and 7 show the results of experiments similar to that of FIG. 5, where the taper angle α of the gasket ridges 7 was 60 deg (FIG. 6) or 120 deg (FIG. 7). A comparison with FIG. 5 reveals that the change of the taper angle α from 90 deg to 60 deg results in a decrease in thrust, while the change of the taper angle α from 90 deg to 120 deg leads to an increase in thrust. Thus, a gasket 4 can be designed to obtain a predetermined value of thrust in a certain range by varying, for example, the Vickers hardness or taper angle.

Figure 8:
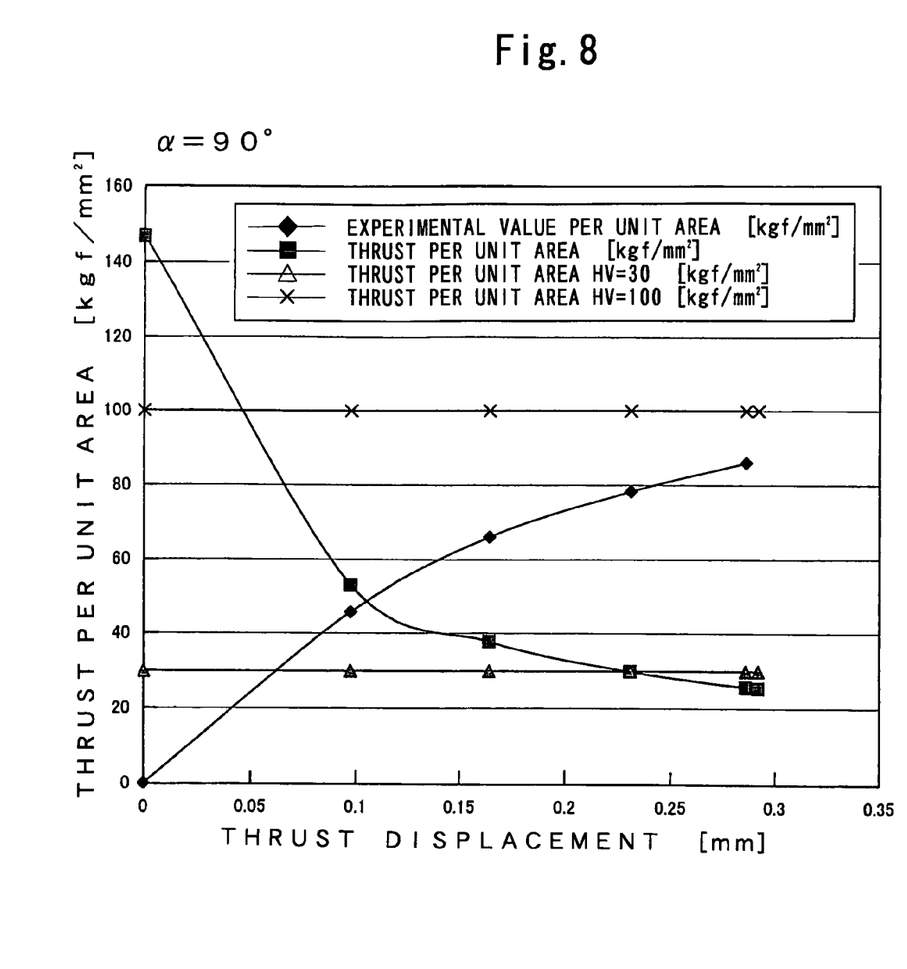
FIG. 8 is another graph for use in obtaining gaskets suitable for use in the fluid coupling of the invention, in the case where the taper angle of the ridge is 90 deg.

FIG. 8 is another graph for use in obtaining gaskets 4 suitable for use in the fluid coupling of the invention. The displacement is plotted as abscissa, the thrust per unit area as ordinate, and the taper angle α of the ridges 7 on the gasket 4 is 90 deg to determine the relationship between the displacement and the thrust per unit area. The experimental values per unit area are the characteristics of the fluid coupling of the invention. The graph of FIG. 8 reveals that the thrust per unit area required for the sealing properties is obtained at a displacement of at least 0.1 mm, i.e., that the requirement that the surface pressure as determined from the minimum tightening-up force<the thrust per unit area for tightening up the coupling can be fulfilled. In view of the factor of safety in actuality, it is thought that the sealing properties can be reliably obtained when the displacement is, for example, a least 0.15 mm. Further if the displacement is, for example, at least 0.4 mm, the thrust per unit area reaches the thrust level corresponding to a gasket Vickers hardness HV of 100, failing to fulfill the requirement, for assuring the fluid coupling 1 of strength, that the thrust per unit area for tightening up the coupling<thrust per unit area as determined from the Vickers hardness of the gasket. In view of the safety factor, therefore, it is desirable to obtain the strength on condition that the displacement should be up to 0.30 mm. Since the displacement corresponds to the height P of the ridges 7 of the gasket, the displacement, if determined, determines the height P of the ridges on the gasket 4.

Figure 9:
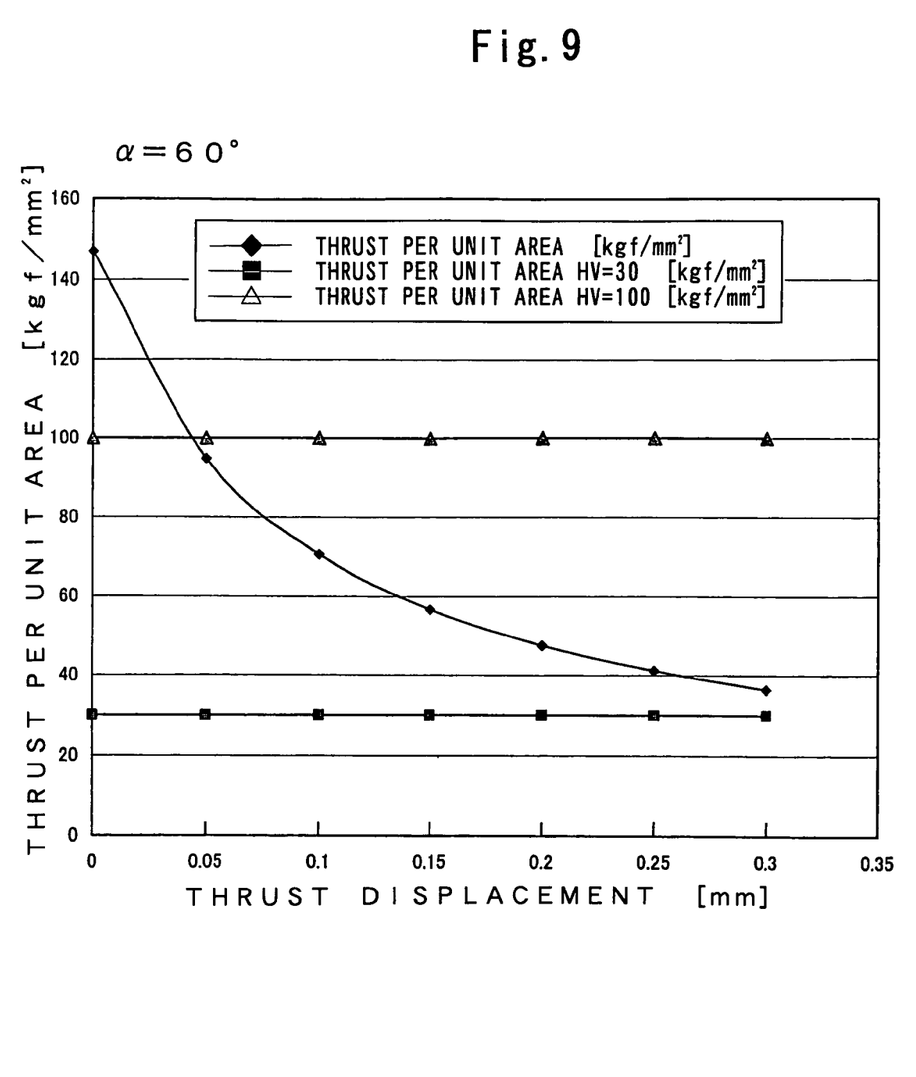
FIG. 9 is a graph similar to FIG. 8 in the case where the taper angle of the ridge is 60 deg.
Figure 10:
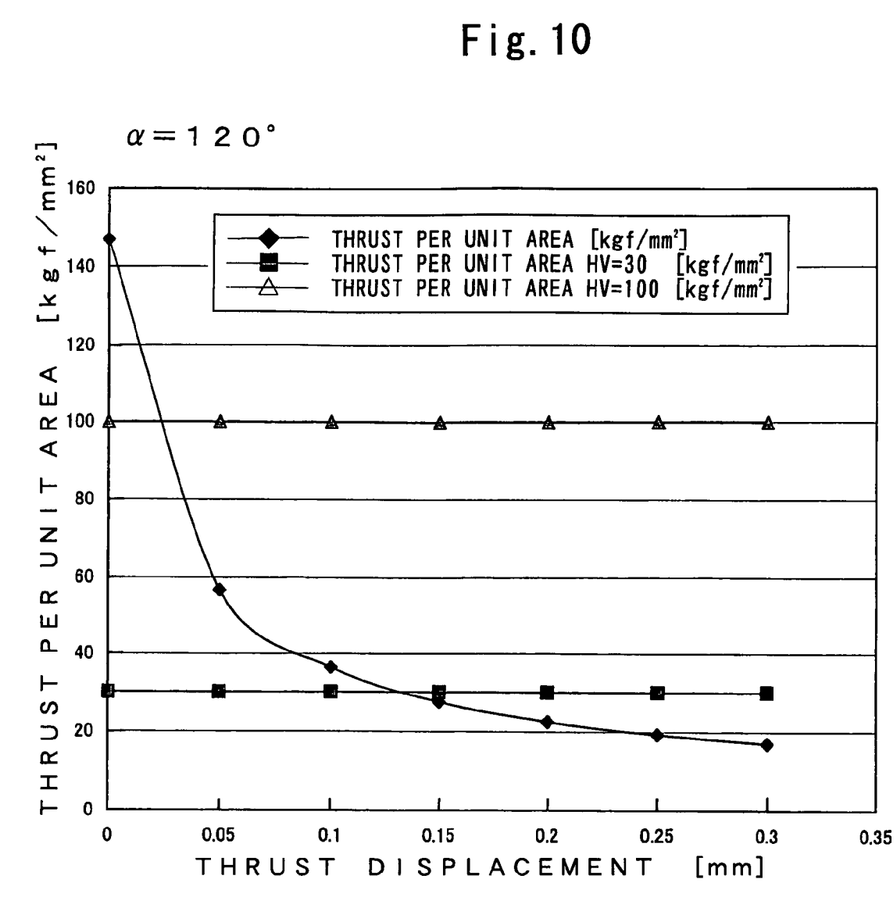
FIG. 10 is a graph similar to FIG. 8 in the case where the taper angle of the ridge is 120 deg.

FIGS. 9 and 10 show the results obtained by conducting experiments similar to that of FIG. 8, with the ridges 7 of the gasket 4 given a taper angle α of 60 deg (FIG. 9) or 120 deg (FIG. 10). A compassion with FIG. 8 shows that that a change in the taper angle α from 90 deg to 60 deg gives rise to a need to increase the thrust per unit area, i.e., the thrust per unit area required for the sealing properties, hence a need to determine whether or not a design alteration is to be made at the same time to increase the height of the ridges for giving an increased displacement. Further when the taper angle α is changed from 90 deg to 120 deg, the thrust per unit area, i.e., the thrust per unit area required for the sealing properties, can be smaller than when the taper angle α is 90 deg. It will then become necessary to determine whether a design alteration is to be made at the same time to increase the displacement by reducing the height of the ridges. Although the Vickers hardness HV is maintained at 100, the Vickers hardness can of course be altered; gaskets 4 which are further improved in both the sealing properties and durability can be designed by varying the Vickers hardness, taper angle, etc. by virtue of the increased freedom of design.

The required Vickers hardness, for example, of HV 100, can be obtained by fully subjecting the gasket 4 of stainless steel to a solid solution heat treatment, and the gasket 4 so treated is then polished to a mirror finish.

INDUSTRIAL APPLICABILITY

In a fluid coupling wherein a gasket interposed between coupling members is deformed to give sealing properties, a proper seal structure is provided between the coupling members, with attention directed also to the shape of the gasket, whereby the fluid coupling is improved in both sealing properties and durability.

The invention claimed is:
1. A fluid coupling comprising a first and a second coupling member having respective fluid channels communicating with each other, and an annular gasket interposed between opposing end faces of the two coupling members and capable of being deformed to provide sealing properties, each of the first and second coupling members being provided in the end face thereof with an annular recessed portion having a flat bottom face, the gasket being annular and disposed within a space defined by the recessed portions of the two coupling members, the gasket having an annular ridge formed on one axial side surface and another annular ridge on the opposite axial side surface thereof, wherein each ridge of the gasket has a trapezoidal cross sectional shape defined by a radially outer tapered face providing an outer peripheral surface, a radially inner tapered face providing an inner peripheral surface, a flat face adjoining both the inner tapered face and the outer tapered face to provide a top end surface of the trapezoidal cross sectional shape, and a base portion adjoining both the inner tapered face and the outer tapered face, the fluid coupling being characterized in that the gasket is metal and has an inner circumference surface which adjoins the base end of the inner tapered surface of the annular ridge and adjoins the base end of the inner tapered surface of the another annular ridge, and the flat face of each ridge of the gasket is orthogonal to the inner circumference surface, the radially outer periphery of the gasket comprises axially opposite beveled surfaces, a cavity having a circular-arc cross section in the axial midportion of outer periphery of the gasket, two connecting portions adjoining respective axially opposite beveled surfaces and the cavity, the two connecting portions being parallel to the inner circumference surface, the axial side surfaces of the gasket further comprising a flat surface adjoining the respective base end of the inner tapered surface of the respective annular ridge and adjoining the respective axially opposite beveled surfaces of the radially outer periphery of the gasket, the flat surfaces being orthogonal to the inner circumference surface, wherein the flat face of each ridge of the gasket contacts the flat bottom face of the respective annular recessed portion and the outer tapered face and the inner tapered face of each ridge of the gasket do not contact with the flat bottom face of the respective annular recessed portion when the two coupling members are fastened together.

2. A fluid coupling according to claim 1 wherein an angle $\alpha$ between the outer tapered face of the annular ridge of the gasket and the inner tapered face thereof is 50 to 130 deg.

* * * * *